United States Patent
Fung et al.

(10) Patent No.: US 9,475,521 B1
(45) Date of Patent: Oct. 25, 2016

(54) FAILSAFE DETECTION

(71) Applicant: Honda Motor Co., Ltd., Tokyo (JP)

(72) Inventors: Kin C. Fung, Dublin, OH (US); Timothy J. Dick, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/733,836

(22) Filed: Jun. 8, 2015

(51) Int. Cl.
| B62D 5/04 | (2006.01) |
| B62D 15/02 | (2006.01) |
| G01D 5/24 | (2006.01) |
| G01L 3/00 | (2006.01) |

(52) U.S. Cl.
CPC ............ B62D 5/049 (2013.01); B62D 15/025 (2013.01); G01D 5/24 (2013.01); G01L 3/00 (2013.01)

(58) Field of Classification Search
CPC ............ B62D 15/025; B60T 2201/08; B60T 2201/087; G08B 21/06; B60W 30/12; G06K 9/00798
USPC ...................................... 701/43, 41; 340/576
See application file for complete search history.

(56) References Cited

U.S. PATENT DOCUMENTS

| 8,428,821 | B2 | 4/2013 | Nilsson |
| 8,983,732 | B2 | 3/2015 | Lisseman et al. |
| 2004/0088095 | A1 | 5/2004 | Eberle et al. |
| 2005/0155808 | A1 | 7/2005 | Braeuchle et al. |
| 2007/0159344 | A1 | 7/2007 | Kisacanin |
| 2009/0313987 | A1 | 12/2009 | Tu |
| 2012/0097472 | A1 | 4/2012 | Kubo et al. |
| 2012/0105639 | A1* | 5/2012 | Stein ...................... H04N 5/235 348/148 |
| 2012/0271513 | A1 | 10/2012 | Yoneda et al. |
| 2012/0290215 | A1 | 11/2012 | Adler et al. |
| 2013/0076499 | A1* | 3/2013 | Okita ...................... B60K 35/00 340/438 |
| 2013/0226408 | A1* | 8/2013 | Fung ...................... B60W 40/09 701/41 |
| 2013/0231830 | A1* | 9/2013 | Van Dan Elzen .... B60W 50/14 701/42 |
| 2013/0245886 | A1 | 9/2013 | Fung et al. |
| 2014/0224040 | A1 | 8/2014 | Van'tZelfde et al. |
| 2016/0068103 | A1* | 3/2016 | McNew .................. B60Q 9/00 701/23 |

FOREIGN PATENT DOCUMENTS

| DE | 102004037298 | 3/2006 |
| DE | 102010013243 | 9/2011 |

(Continued)

OTHER PUBLICATIONS

International Search Report and Written Opinion of PCT/US2015/037019 dated Nov. 2, 2015, 12 pages.

*Primary Examiner* — Marthe Marc-Coleman
(74) *Attorney, Agent, or Firm* — Rankin, Hill & Clark LLP

(57) ABSTRACT

Systems and techniques for failsafe detection of vehicle components are provided herein. A system for failsafe detection may include one or more touch sensors determining presence information associated with a number of hands or other appendages an operator of a vehicle has in contact with a steering wheel of the vehicle. The system may include an electronic power steering (EPS) component estimating presence information indicative of whether the operator of the vehicle has hands or other appendages in contact with the steering wheel of the vehicle. The system may include a failsafe component comparing the presence information of the touch sensors with the presence information of the electronic power steering component and generating a component determination for one or more of the touch sensors based on the comparison.

20 Claims, 4 Drawing Sheets

(56) References Cited

FOREIGN PATENT DOCUMENTS

| DE | 102012102459 | 9/2013 |
| EP | 2426012 | 3/2012 |
| KR | 20110127978 | 11/2011 |
| WO | 2014123222 | 8/2014 |

\* cited by examiner

FAILSAFE DETECTION

BACKGROUND

Touch sensors may be used as replacements for mechanical buttons or as input devices. For example, by detecting human body capacitance, a capacitive touch sensor may detect the difference between objects which have a different dielectric constant than the dielectric constant of air. However, other types of touch sensors may also be used as input devices. For example, a resistive touchscreen may be provided in place of a capacitive touchscreen. As with all sensors, there is a possibility of failure, false positive readings, false negative readings, etc.

BRIEF DESCRIPTION

According to one or more aspects, a system for failsafe detection includes one or more touch sensors, an electronic power steering (EPS) component, and a failsafe component. The touch sensors may determine presence information associated with a number of hands or other appendages an operator of a vehicle has in contact with a steering wheel of the vehicle. The EPS component may estimate presence information indicative of whether the operator of the vehicle has hands or other appendages in contact with the steering wheel of the vehicle. The failsafe component may compare the presence information of the touch sensors with the presence information of the electronic power steering component and generate a component determination for one or more of the touch sensors based on the comparison.

The electronic power steering component may estimate presence information based on readings from one or more torque sensors or one or more steering angle sensors coupled to the steering wheel. The controller area network component may receive a first reading from one or more of the touch sensors and a second reading from one or more of the torque sensors or one or more of the steering angle sensors. One or more of the touch sensors may be mounted to the steering wheel.

The system may include a notification component rendering a notification upon the component determination indicating a failure of one or more of the touch sensors. The failsafe component may determine one or more corrective actions for one or more vehicle components based on the component determination and component dependencies of one or more of the vehicle components. The system may include a lane keep assist component generating one or more lane keep assist actions based on presence information from one or more of the touch sensors. The failsafe component may disable the lane keep assist component based on the component determination indicating a failure of one or more of the touch sensors.

According to one or more aspects, a method for failsafe detection includes receiving a first reading from a first set of one or more sensors of a steering wheel of a vehicle, the first reading indicative of presence information associated with a number of hands or other appendages an operator of the vehicle has in contact with the steering wheel, receiving a second reading from a second set of one or more sensors of the vehicle, estimating presence information indicative of whether the operator of the vehicle has hands or other appendages in contact with the steering wheel based on the second reading from the second set of sensors, comparing the presence information of the first reading with the presence information of the second reading, and generating a component determination for the first set of sensors or the second set of sensors based on the comparison of presence information between the first reading and the second reading.

In one or more embodiments, the method may include rendering a notification upon generation of the component determination indicating a failure of the first set of sensors or the second set of sensors. The method may include generating one or more lane keep assist actions based on presence information from the first set of sensors. According to one or more aspects, one or more of the lane keep assist actions may be generated based on presence information from the second set of sensors and not the first set of sensors when the component determination is indicative of a failure of the first set of sensors. According to other aspects, one or more of the lane keep assist actions may be disabled when the component determination is indicative of a failure of the first set of sensors. In this way, the component determination may be indicative of whether a corresponding set of sensors has failed.

According to one or more aspects, a system for failsafe detection includes one or more touch sensors, an electronic power steering (EPS) component, and a failsafe component. The touch sensors may determine presence information associated with a number of hands or other appendages an operator of a vehicle has in contact with a steering wheel of the vehicle. The EPS component may estimate presence information indicative of whether the operator of the vehicle has hands or other appendages in contact with the steering wheel of the vehicle by taking readings from one or more torque sensors. The failsafe component may compare the presence information of the touch sensors with the presence information of the electronic power steering component, generate a component determination for one or more of the touch sensors based on the comparison, and determine one or more corrective actions for one or more vehicle components based on the component determination and touch sensor dependencies of one or more of the vehicle components.

In one or more embodiments, one or more of the touch sensors may be mounted to the steering wheel. The system may include a notification component rendering a notification upon the component determination indicating a failure of one or more of the touch sensors. The system may include a lane keep assist component generating one or more lane keep assist actions based on presence information from one or more of the touch sensors. One or more of the corrective actions may include disabling the lane keep assist component. The system may include a controller area network component transmitting a disable signal to the lane keep assist component in response to the component determination indicating a failure of one or more of the touch sensors.

DETAILED DESCRIPTION

Figure 1:
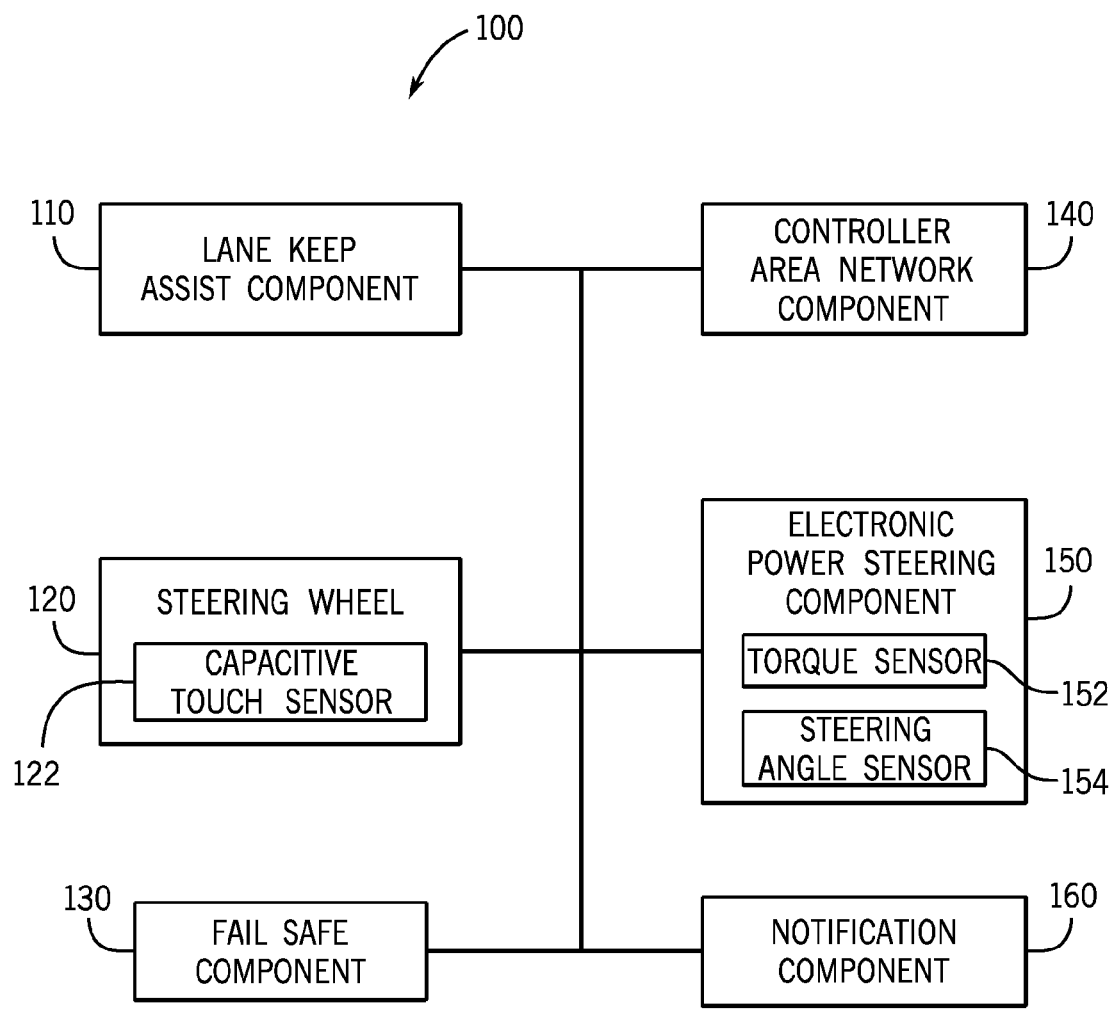
FIG. 1 is an illustration of an example component diagram of a system for failsafe detection, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art. The following terms are used throughout the disclosure, the definitions of which are provided herein to assist in understanding one or more aspects of the disclosure.

FIG. 1 is an illustration of an example component diagram of a system 100 for failsafe detection, according to one or more embodiments. A system 100 for failsafe detection may be implemented to detect a failure of one or more vehicle components, such as a sensor, touch sensor, a touch steering wheel, etc. In one or more embodiments, a system 100 for failsafe detection may include a lane keep assist component 110, a steering wheel 120, a failsafe component 130, a controller area network component 140, an electronic power steering component 150, and a notification component 160.

A lane keep assist component 110, lane keeping assist system (LKAS) or a semi-autonomous driving system may help a driver or operator of a vehicle maintain a position of a vehicle in a current lane on a roadway. For example, a lane keep assist component 110 may provide feedback or steering to turn a vehicle back into a lane if the vehicle is drifting out of the lane. As another example, the lane keep assist component 110 may provide similar feedback or steering as lane keep assist actions to mitigate drifting by keeping the vehicle in a center of a lane or otherwise preventing vehicle drift. The lane keep assist component 110 may operate or provide lane keeping assistance when a driver or an operator of a vehicle has at least one hand in contact with a steering wheel 120 of the vehicle.

The steering wheel 120 of a vehicle may be equipped with one or more touch sensors 122 to facilitate detection of presence information indicative of whether a driver has his or her hands or other appendages on the steering wheel 120. For example, one or more of the touch sensors 122 may be mounted to the steering wheel 120. These touch sensors 122 may take readings, such as a first reading indicative of presence information associated with a number of hands or other appendages an operator of the vehicle has in contact with the steering wheel 120. In other words, the touch sensors 122 may detect whether a driver has zero, one, or two hands or any other appendages, such as a knee, on the steering wheel 120. Thus, the touch sensors 122 of the steering wheel 120 may determine presence information associated with a number of hands or other appendages on or in contact with a steering wheel 120 of the vehicle. In other embodiments, other types of touch sensors may be used, such as resistive or piezoelectric sensors.

In one or more embodiments, the lane keep assist component 110 may utilize presence information from touch sensors 122 of the steering wheel 120 to enable generation of lane keep assist actions. This presence information may be received over a controller area network component 140, which facilitates communication between different vehicle components or components of a vehicle. In other embodiments, presence information from one or more of the touch sensors 122 of the steering wheel 120 may be utilized to enable, disable, or control other aspects of the vehicle, such as a user interface rendered by the notification component 160, a navigation component (not shown), etc.

As with all sensors or components, touch sensors 122 of the steering wheel 120 may fail or malfunction from time to time. When this occurs, it may be difficult to determine or pinpoint when the touch sensor 122 has failed, the touch sensor 122 is providing false positives or false negatives, incorrectly detecting hands on or hands off of the steering wheel 120, etc.

Because one or more vehicle components (e.g., the lane keep assist component 110) may use signals or readings from the touch sensor 122 of the steering wheel 120 or readings from a touch steering wheel, the failsafe component 130 may generate component determinations which are indicative of whether a vehicle component, such as the touch sensor 122 is functional or not. In one or more embodiments, the failsafe component achieves this by comparing presence information of a user's or driver's hands or other appendages on the steering wheel 120 received from the touch sensor 122 with estimated presence information regarding the user's hands from an electronic power steering (EPS) component 150.

In other words, if the detection of the touch sensors 122 of steering wheel 120 does not match the estimation of the EPS component 150 then the system 100 may stop using the steering wheel 120 to determine hands on or hands off for driver sensing purposes. Here, in this example, if the touch steering wheel 120 sensing result is different than the EPS sensing result (e.g., x different results between the two over y seconds), the steering wheel 120 touch function may be considered to have failed, and other corrective action may be taken accordingly (e.g., navigation system locked, lane keep assist disable, failure notification displayed, etc.). In one or more embodiments, a threshold number of differing results over a predetermined time period may be used to define a failed component or malfunctioning component for a component determination.

As an example, if steering wheel 120 detects that the driver has either both hands on the steering wheel 120 or at least one hand on the steering wheel 120 in order to unlock a navigation system or navigation component (not shown) for passenger use, then the failsafe component 130 may disable the navigation system, lock, or unlock the navigation system in response to differing or non-matching results from the EPS component 150 and the touch sensor 122 of the steering wheel 120. In one or more embodiments, during failsafe detection or comparison, if the touch sensor 122 of steering wheel 120 sensing is different than the EPS component 150 X times over Y seconds, the failsafe component 130 may generate a determination that the touch sensors 122 of the steering wheel 120 have failed and that the navigation system should be locked and have a failure indication displayed or rendered by the notification component 160.

Further, one or more corrective actions may be taken in the event that the presence information between these two sensors or components (e.g., touch sensor 122 and sensors of the electronic power steering component or EPS component 150) does not match up, thereby indicating a failure of at least one of the respective sensors or components. Corrective actions may include displaying a failure notification, disabling one or more vehicle systems or components which rely on one or more of the sensors or components (e.g., 122, 150, etc.).

Regardless, the electronic power steering (EPS) component 150 can estimate whether or not the driver has taken his hands off the wheel in order to warn the driver when he has engaged one or more vehicle components, such as the lane keep assist system (LKAS) or the lane keep assist component 110. For example, the electronic power steering component 150 may generate a hands on or hands off estimation or an estimation of presence information by detecting the amount of torque or force applied to a steering wheel 120, via one or more torque sensors 152 or steering angle sensors 154. FIG. 1 depicts the torque sensor and steering angle sensor as part of the EPS component 150, however, it could be part of any other vehicle system.

In other words, one or more driving inputs, such as torque, steering effort, steering angle, steering wheel angular velocity, steering wheel position, etc. may be taken using one or more sensors associated with or coupled to the electronic power steering component 150. Examples of such sensors may include one or more torque sensors 152, one or more steering angle sensors 154, etc. In this way, the electronic power steering component 150 may estimate presence information indicative of whether the operator of the vehicle has hands or other appendages in contact with the steering wheel 120 of the vehicle. For example, this may be achieved by taking readings from one or more torque sensors 152 or one or more steering angle sensors 154 coupled to the steering wheel 120. Accordingly, readings from these sensors 152 or 154 (e.g., different than touch sensors 122 of a steering wheel 120) may be used to estimate presence information or otherwise determine if a driver has his or her hands or other appendages on the steering wheel.

The controller area network component 140 may facilitate communication between different components or sensors of a vehicle. For example, the controller area network component may transmit readings from the touch sensor 122 or readings from the torque sensors 152 or steering angle sensors 154 to the failsafe component 130 for analysis. Thus, the controller area network component 140 may receive a first reading from a first set of one or more sensors of a vehicle and a second reading from a second set of one or more sensors of the vehicle. For example, the first set of sensors could be the touch sensor(s) 122 and the second set could be the torque sensor(s) 152 or the steering angle sensor(s) 154.

Further, the controller area network component 140 may transmit or pass the respective readings on to other components, such as the failsafe component 130. Upon generation of a component determination by the failsafe component 130, the controller area network component 140 may pass or transmit the component determination to other components, such as the lane keep assist component 110 or the notification component 160. In one or more embodiments, the controller area network component 140 may be used to notify the touch steering wheel 120 that the touch sensor 122 is malfunctioning, and to disable any associated touch sensing functionality, for example.

The failsafe component 130 may determine functionality of one or more components using both the touch sensor 122 of the steering wheel 120 and sensors of the electronic power steering component 150 as inputs. In this way, the electronic power steering component 150 may act as a failsafe mechanism against the touch sensor 122 of the steering wheel 120. Stated another way, the failsafe component 130 may verify a hands-on or a hands-off scenario by comparing a hands on or hands off estimation of an electronic power steering (EPS) component 150 with capacitance readings or results from the touch sensor 122 of the steering wheel 120. In this way, the failsafe component 130 may provide a failsafe determination which acts as a double check for the touch sensor 122 of the steering wheel 120 by comparing presence information of a first reading from a first set of sensors with presence information of a second reading from a second set of sensors.

For example, the first set of sensors may be the touch sensor(s) 122 of the steering wheel 120 and the second set of sensors may be the torque sensor(s) 152 or the steering angle sensor(s) 154 of the electronic power steering component 150. Thus, the failsafe component 130 would compare presence information of the touch sensors 122 with presence information of the electronic power steering component 150. From this, the failsafe component 130 may generate a component determination for a first set of sensors or a second set of sensors based on the comparison of presence information between the first and second readings. Effectively, the component determination may be a determination which is indicative of whether a corresponding set of sensors has failed. Accordingly, in one or more embodiments, the failsafe component 130 may generate a component determination for one or more of the touch sensors 122 based on the comparison of presence information from the touch sensors 122 and the sensors 152 or 154 of the electronic power steering component 150.

Thus, in the event that a touch sensor 122 of the steering wheel 120 fails, the failsafe component 130 may detect such a failure event, communicate this failure to other systems via the controller area network component 140, and disable functions based on the touch sensor 122 or use alternative devices, systems, components, etc. to compensate for the absence of the touch sensor functionality. For example, this determination of functionality (e.g., component determination) may be used as an input for other systems or components, such as the lane keep assist component 110. In other words, the failsafe component 130 may compare the output of the touch sensor 122 to an estimation provided by an electronic power steering component 150 as a failsafe for the lane keeping system, and generate corrective action accordingly, such as by disabling a lane keep assist component 110 which may rely on or utilize readings from the touch sensor 122. In this way, an improved lane keep assist system may be provided.

In one or more embodiments, as a default, the lane keep assist (LKAS) component 110 may generate one or more lane keep assist actions based on presence information from the first set of sensors, such as the touch sensor 122. For example, a lane keep assist action may include feedback, such as vibrating the steering wheel 120, automatic steering actions which cause the vehicle to stay in a lane or mitigate drifting outside of a lane, etc. In one or more embodiments, the lane keep assist component 110 may utilize a second set of sensors as a backup when a first set of sensors is determined to have failed. In other words, the lane keep assist component 110 may generate one or more lane keep assist actions based on presence information from a second set of sensors and not a first set of sensors when a component determination is indicative of a failure of the first set of sensors.

As an example, the first set of sensors may be the touch sensors 122 and the second set of sensors may be sensors of the electronic power steering component 150. Regardless, the failsafe component 130 may manage other components, such as the lane keep assist component 110 by issuing commands over the controller area network component 140. The failsafe component 130 may disable one or more of the lane keep assist actions when the component determination is indicative of a failure of the first set of sensors. In other words, the failsafe component 130 may determine one or more corrective actions as disabling the lane keep assist component 110. Here, the controller area network component 140 may transmit a disable signal to the lane keep assist component 110 in response to the failsafe component generating a component determination indicative of a failure of one or more of the touch sensors 122.

In one or more embodiments, the failsafe component may determine one or more corrective actions for one or more vehicle components based on the component determination and component dependencies of one or more vehicle components. Vehicle components may include any of the components or sensors of FIG. 1, such as the touch sensor 122, the torque sensor 152, the steering angle sensor 154, etc. Component dependencies may include components which use readings, signals, data, or information as inputs. For example, a navigation component (not shown) may be unlocked in response to a hand touching the steering wheel 120, as determined by the touch sensor 122. Because the navigation component uses information or readings from the touch sensor, the navigation component would have a component dependency on the touch sensor 122 in the sense that the touch sensor 122 provides inputs or readings to the navigation component, for example.

In one or more embodiments, the failsafe component 130 may determine one or more corrective actions for one or more vehicle components based on the component determination and touch sensor 122 dependencies of one or more of the vehicle components, such as when the touch sensor is a primary sensor for an application, and other sensors may be used as a secondary, tertiary, or as backups, for example. In a scenario where the lane keep assist component 110 has a component dependency on the touch sensor 122 of the steering wheel 120, the failsafe component 130 may disable the lane keep assist component 110 based on a component determination indicating a failure of one or more of the touch sensors 122.

Corrective actions may include having notifications rendered, such as via the notification component 160. In one or more embodiments, the notification component may render a corresponding notification upon generation of the component determination indicating a failure of the first set of sensors or the second set of sensors. For example, when the touch sensor 122 fails, the notification component 160 may render a notification indicating that the touch sensor 122 has failed. Notifications may include audio, visual, or tactile feedback.

Figure 2:
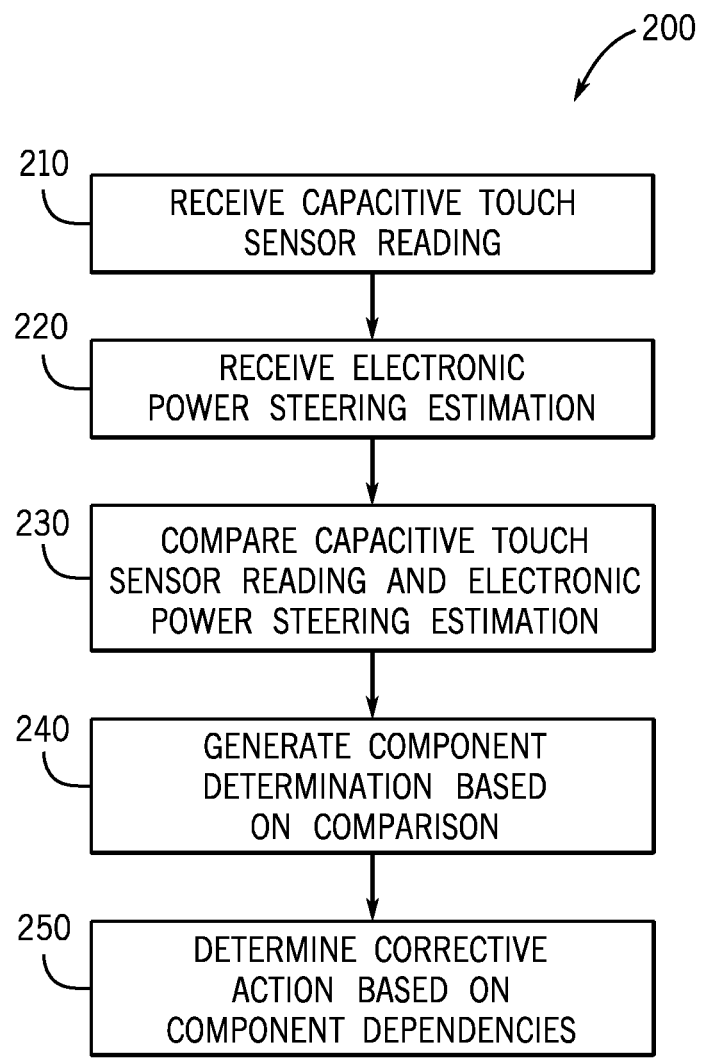
FIG. 2 is an illustration of an example flow diagram of a method for failsafe detection, according to one or more embodiments.

FIG. 2 is an illustration of an example flow diagram of a method 200 for failsafe detection, according to one or more embodiments. At 210, one or more touch sensor readings may be received. These readings may be indicative of presence information associated with a number of hands a driver has on a steering wheel of a vehicle. At 220, an estimation associated with an electronic power steering unit or component of a vehicle may be received or determined. For example, readings from steering angle or torque sensors may be used to determine an estimation of presence information related to whether a driver is or is not in contact with a steering wheel, such as based on effort or force being applied to a steering wheel. At 230, results or readings from the touch sensor and the electronic power steering estimation are compared. For example, if the touch sensor determines that a driver has one or two hands on a steering wheel and the electronic power steering estimation is indicative of presence information showing that a driver is in contact with the steering wheel or is applying force to the steering wheel, the comparison would generate a consistent result. Accordingly, at 240, a component determination would be generated which indicates that the sensors produced consistent results. In the event the results or the comparison between the presence information was associated with inconsistent results, the component determination would indicate a failure of one of the sensors, such as a failure of the touch sensor. At 250, one or more corrective actions may be determined based on component dependencies and the component determination. In other words, if a sensor has failed or is determined to have failed, and other components rely on or use readings from the failed sensor, then corrective action may be provided, such as by disabling those components, etc.

Figure 3:
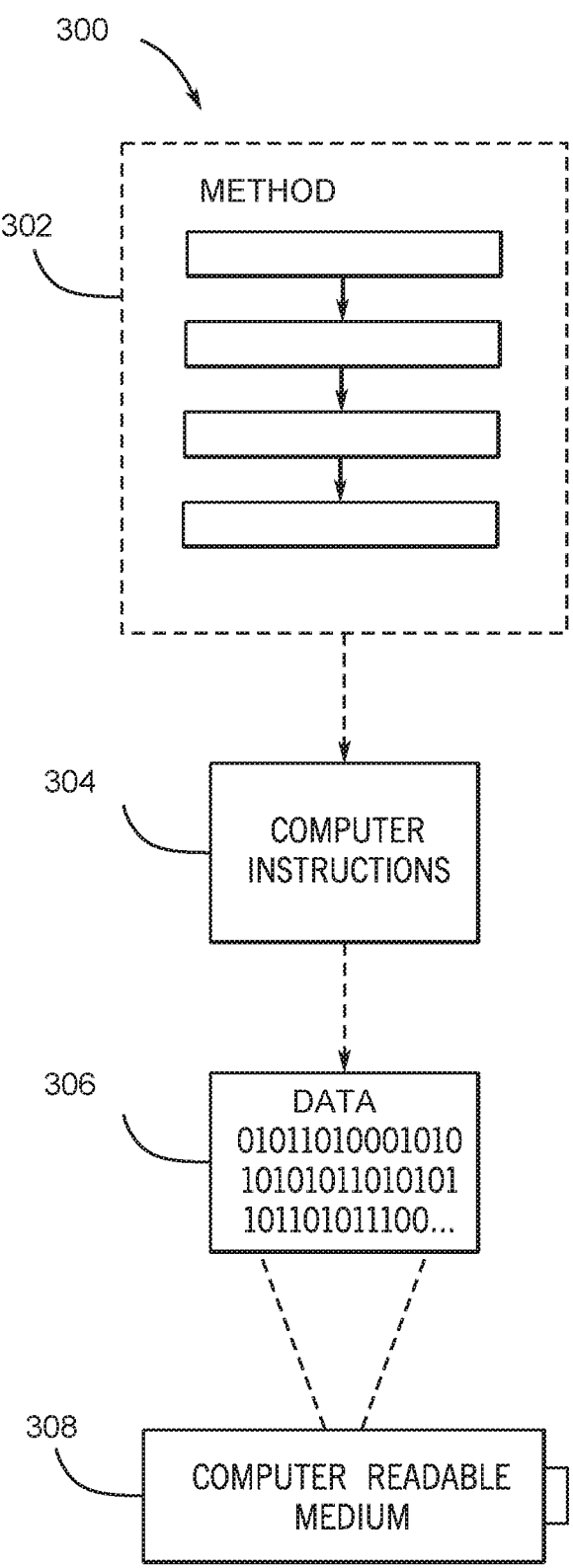
FIG. 3 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 3, wherein an implementation 300 includes a computer-readable medium 308, such as a CD-R, DVD-R, flash drive, a platter of a hard disk drive, etc., on which is encoded computer-readable data 306. This computer-readable data 306, such as binary data including a plurality of zero's and one's as shown in 306, in turn includes a set of computer instructions 304 configured to operate according to one or more of the principles set forth herein. In one such embodiment 300, the processor-executable computer instructions 304 may be configured to perform a method, such as the method 200 of FIG. 2. In another embodiment, the processor-executable instructions 304 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 4:
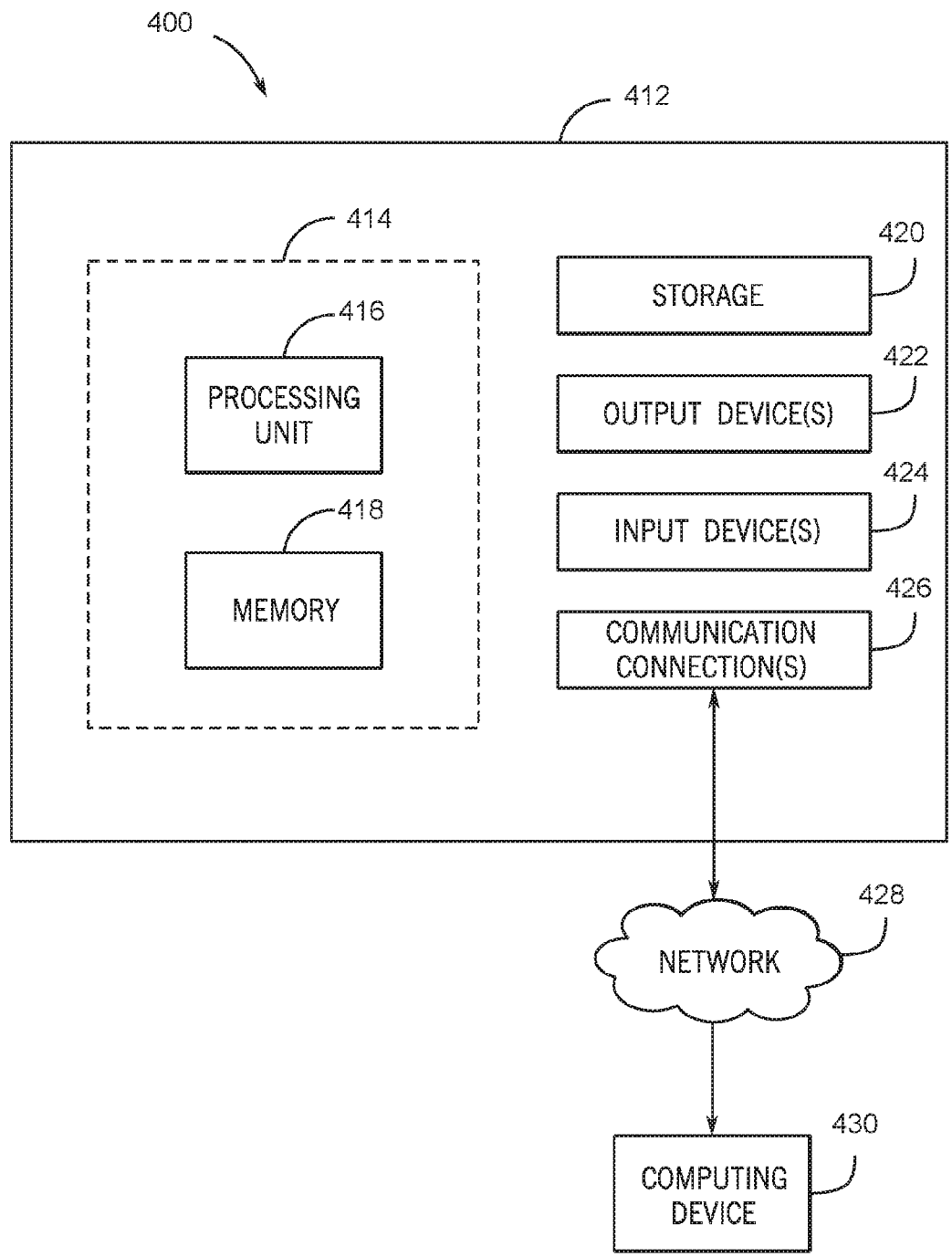
FIG. 4 is an illustration of an example computing environment where one or more of the provisions set forth herein are implemented, according to one or more embodiments.

FIG. 4 and the following discussion provide a description of a suitable computing environment to implement embodiments of one or more of the provisions set forth herein. The operating environment of FIG. 4 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media objects, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 4 illustrates a system 400 including a computing device 412 configured to implement one or more embodiments provided herein. In one configuration, computing device 412 includes at least one processing unit 416 and memory 418. Depending on the exact configuration and type of computing device, memory 418 may be volatile, such as RAM, non-volatile, such as ROM, flash memory, etc., or a combination of the two. This configuration is illustrated in FIG. 4 by dashed line 414.

In other embodiments, device 412 includes additional features or functionality. For example, device 412 may include additional storage such as removable storage or non-removable storage, including, but not limited to, magnetic storage, optical storage, etc. Such additional storage is illustrated in FIG. 4 by storage 420. In one or more embodiments, computer readable instructions to implement one or more embodiments provided herein are in storage 420. Storage 1120 may store other computer readable instructions to implement an operating system, an application program, etc. Computer readable instructions may be loaded in memory 418 for execution by processing unit 416, for example.

The term "computer readable media" as used herein includes computer storage media. Computer storage media includes volatile and nonvolatile, removable and non-removable media implemented in any method or technology for storage of information such as computer readable instructions or other data. Memory 418 and storage 420 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 412. Any such computer storage media is part of device 412.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 412 includes input device(s) 424 such as keyboard, mouse, pen, voice input device, touch input device, infrared cameras, video input devices, or any other input device. Output device(s) 422 such as one or more displays, speakers, printers, or any other output device may be included with device 412. Input device(s) 424 and output device(s) 422 may be connected to device 412 via a wired connection, wireless connection, or any combination thereof. In one or more embodiments, an input device or an output device from another computing device may be used as input device(s) 424 or output device(s) 422 for computing device 412. Device 412 may include communication connection(s) 426 to facilitate communications with one or more other devices.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for failsafe detection comprising:
   one or more touch sensors determining presence information associated with a number of hands or other appendages an operator of a vehicle has in contact with a steering wheel of the vehicle;
   an electronic power steering (EPS) component estimating presence information indicative of whether the operator of the vehicle has hands in contact with the steering wheel of the vehicle; and
   a failsafe component:
     comparing the presence information of the touch sensors with the presence information of the electronic power steering component; and
     generating a component determination for one or more of the touch sensors based on the comparison.

2. The system of claim 1, wherein the electronic power steering component estimates presence information based on readings from one or more torque sensors or one or more steering angle sensors coupled to the steering wheel.

3. The system of claim 2, comprising a controller area network component receiving:
   a first reading from one or more of the touch sensors; and
   a second reading from one or more of the torque sensors or one or more of the steering angle sensors.

4. The system of claim 1, wherein one or more of the touch sensors are capacitive touch sensors.

5. The system of claim 1, comprising a notification component rendering a notification upon the component determination indicating a failure of one or more of the touch sensors.

6. The system of claim 1, wherein the failsafe component determines one or more corrective actions for one or more vehicle components based on the component determination and component dependencies of one or more of the vehicle components.

7. The system of claim 1, comprising a lane keep assist component generating one or more lane keep assist actions based on presence information from one or more of the touch sensors.

8. The system of claim 7, wherein the failsafe component disables the lane keep assist component based on the component determination indicating a failure of one or more of the touch sensors.

9. A method for failsafe detection comprising:
   receiving a first reading from a first set of one or more sensors of a steering wheel of a vehicle, the first reading indicative of presence information associated with a number of hands or other appendages an operator of the vehicle has in contact with the steering wheel;
   receiving a second reading from a second set of one or more sensors of the vehicle;
   estimating presence information indicative of whether the operator of the vehicle has hands or other appendages in contact with the steering wheel based on the second reading from the second set of sensors;
   comparing the presence information of the first reading with the presence information of the second reading; and
   generating a component determination for the first set of sensors or the second set of sensors based on the comparison of presence information between the first reading and the second reading.

10. The method of claim 9, comprising rendering a notification upon generation of the component determination indicating a failure of the first set of sensors or the second set of sensors.

11. The method of claim 9, comprising generating one or more lane keep assist actions based on presence information from the first set of sensors.

12. The method of claim 11, comprising generating one or more of the lane keep assist actions based on presence information from the second set of sensors and not the first set of sensors when the component determination is indicative of a failure of the first set of sensors.

13. The method of claim 11, comprising disabling one or more of the lane keep assist actions when the component determination is indicative of a failure of the first set of sensors.

14. The method of claim 9, wherein the component determination is indicative of whether a corresponding set of sensors has failed.

15. A system for failsafe detection comprising:
   one or more touch sensors determining presence information associated with a number of hands or other appendages an operator of a vehicle has in contact with a steering wheel of the vehicle;
   an electronic power steering (EPS) component estimating presence information indicative of whether the operator of the vehicle has hands or other appendages in contact with the steering wheel of the vehicle by taking readings from one or more torque sensors; and
   a failsafe component:
     comparing the presence information of the touch sensors with the presence information of the electronic power steering component;
     generating a component determination for one or more of the touch sensors based on the comparison; and
     determining one or more corrective actions for one or more vehicle components based on the component determination and touch sensor dependencies of one or more of the vehicle components.

16. The system of claim 15, wherein one or more of the touch sensors are capacitive touch sensors.

17. The system of claim 15, comprising a notification component rendering a notification upon the component determination indicating a failure of one or more of the touch sensors.

18. The system of claim 15, comprising a lane keep assist component generating one or more lane keep assist actions based on presence information from one or more of the touch sensors.

19. The system of claim 18, wherein one or more of the corrective actions includes disabling the lane keep assist component.

20. The system of claim 19, comprising a controller area network component transmitting a disable signal to the lane keep assist component in response to the component determination indicating a failure of one or more of the touch sensors.

* * * * *